(12) United States Patent
Nitta

(10) Patent No.: US 7,418,889 B2
(45) Date of Patent: Sep. 2, 2008

(54) INDEX TABLE ASSEMBLY

(75) Inventor: Tetsuya Nitta, Kanazawa (JP)

(73) Assignee: Tsudakoma Kogyo Kabushiki Kaisha, Ishikawa-ken (JP)

( * ) Notice: Subject to any disclaimer, the term of this patent is extended or adjusted under 35 U.S.C. 154(b) by 82 days.

(21) Appl. No.: 10/913,547

(22) Filed: Aug. 9, 2004

(65) Prior Publication Data

US 2005/0151048 A1   Jul. 14, 2005

(30) Foreign Application Priority Data

Nov. 6, 2003   (JP) ............................. 2003-376465

(51) Int. Cl.
B23Q 16/10   (2006.01)
(52) U.S. Cl. ................................. 74/813 L
(58) Field of Classification Search .............. 74/425, 74/490.09, 490.07, 813 R, 813 L
See application file for complete search history.

(56) References Cited

U.S. PATENT DOCUMENTS

| 4,333,363 A | | 6/1982 | Inaba et al. | |
| 4,467,680 A | * | 8/1984 | Kettel | ............ 82/159 |
| 5,735,514 A | | 4/1998 | Moore et al. | |
| 5,918,510 A | * | 7/1999 | Uemura et al. | ............ 74/813 L |
| 7,077,030 B2 | * | 7/2006 | Watanabe | ............ 74/813 R |
| 2003/0126942 A1 | * | 7/2003 | Watanabe et al. | ............ 74/813 R |

FOREIGN PATENT DOCUMENTS

| EP | 0838311 A1 | 4/1998 |
| EP | 0899057 A | 3/1999 |
| JP | 7-50133 | 11/1995 |
| WO | WO-02-090045 | 11/2002 |

OTHER PUBLICATIONS

European Search Report for Application No. 04025663.8, mailed Dec. 16, 2005.

* cited by examiner

Primary Examiner—Richard W L Ridley
Assistant Examiner—Terence Boes
(74) Attorney, Agent, or Firm—Edwards Angell Palmer & Dodge LLP

(57) ABSTRACT

An index table assembly includes a rotary table, a frame separated from the rotary table in the direction of a rotational axis of the rotary table, a clamping device for bringing the rotary table into contact with the frame by moving the rotary table along the rotational axis, a first bearing disposed between the rotary table and the frame, and an urging device disposed between the first bearing and one of the rotary table and the frame and pressing the first bearing against the other one of the rotary table and the frame at least when the rotary table rotates.

4 Claims, 9 Drawing Sheets

INDEX TABLE ASSEMBLY

BACKGROUND OF THE INVENTION

1. Field of the Invention

The present invention relates to index table assemblies.

2. Description of the Related Art

Index table assemblies including a clamping device for bringing a rotary table into contact with a frame by moving the rotary table along a rotational axis thereof are known in the art (refer to, for example, Japanese Examined Utility Model Registration Application Publication No. 7-50133, FIG. 1 on page 4). In such an index table assembly, the rotary table is pressed against the frame over the entire circumference thereof when it is clamped, so that the rotary table is prevented from being tilted by an external force applied during workpiece processing. Accordingly, the workpiece-processing accuracy is maintained.

In an index table assembly shown in FIG. 9, a clamping device includes a plurality of hydraulic actuators arranged in a frame 1 along a circle centered on a rotational axis 15 at a constant interval. Each of the hydraulic actuators includes a piston 35 projecting from the frame 1, the piston 35 being fitted in a groove with a T-shaped cross section formed in a rotary table 2 such that a flange of the piston 35 engages with step in the groove. When the rotary table 2 is clamped, each of the pistons 35 receives hydraulic pressure and moves in a retracting direction. Accordingly, the rotary table 2 is pressed against the frame 1 by the flanges of the pistons 35 and comes into contact with the frame 1 over the entire circumference thereof. When the rotary table 2 is unclamped, the hydraulic pressure is removed and the rotary table 2 is released from the frame 1 so that the rotary table 2 can rotate.

As described above, when the rotary table 2 is unclamped, the hydraulic pressure is removed and the rotary table 2 is released from the frame 1 so that the rotary table 2 can rotate. However, since the rotary table 2 receives the load of onboard components such as a workpiece, a process table, and a jig, the rotary table 2 comes into contact with the frame 1 due to the load of the onboard components and its own load and large rotational resistance is caused. Therefore, a large amount of power is required to rotate the rotary table 2. In addition, a driving device of the rotary table 2, that is, a divider is quickly worn and the workpiece-processing accuracy is degraded. In particular, when, for example, the workpiece is unevenly placed and the center of gravity of the onboard components is distant from the rotational axis 15, the rotary table 2 is strongly pressed against the frame 1 in a local region of the frame 1 and the rotational resistance greatly increases. In addition, since the rotary table 2 does not always rotate by one turn, a clamping surface 2b of the rotary table 2 and a clamping surface 1b of the frame 1 are greatly worn in a certain region. In such a case, the perpendicularity of the clamping surfaces 2b and 1b of the rotary table 2 and the frame 1, respectively, relative to the rotational axis 15 is degraded. If the perpendicularity of the clamping surfaces 2b and 1b relative to the rotational axis 15 is degraded, the clamping surfaces 2b and 1b cannot be in even contact with each other over the entire circumference when the rotary table 2 is clamped and there is a risk that a gap will be generated in a certain region. In addition, even when the clamping surfaces 2b and 1b can be in contact with each other over the entire circumference, the perpendicularity of a workpiece-receiving surface of the rotary table 2 relative to the rotational axis 15 is degraded and the workpiece-processing accuracy is reduced accordingly. When a gap is generated between the clamping surfaces 2b and 1b, the clamping force is reduced and the rotary table 2 is tilted due to the external force applied during processing. Accordingly, also in this case, the workpiece-processing accuracy is reduced.

Therefore, an index table assembly disclosed in the above-mentioned publication includes elastically deformable rolling elements disposed between a rotating ring fixed to a rotary table and a frame. In this index table assembly, when the rotary table is clamped, the rotating ring is urged toward the frame, moves along the rotational axis while deforming the rolling elements, and is pressed against the frame. When the rotary table is unclamped, the urging force applied to the rotating ring is removed so that the rotary table can rotate, and the rolling elements return to their original shapes to support the rotating ring above the frame. Accordingly, the rotational resistance of the rotary table is equal to the rolling resistance of the rolling elements, and therefore the rotary table can easily rotate.

However, when the rotary table rotates, the rolling elements receive not only the load of the rotary table but also the load of onboard components such a workpiece, a process table, and a jig, and are therefore elastically deformed into a shape with an elliptical cross section. Accordingly, the rolling elements are constantly deformed into a shape with an elliptical cross section while they roll between the rotating ring and the frame. Since a large force is required for deforming the elastic elements, a large force is required for rolling the rolling elements. Therefore, the rotational resistance of the rotary table is also large in this index table assembly. In addition, since a large force is required for rolling the rolling elements while deforming them, sliding of the rolling elements relative to the rotating ring and the frame occurs. Accordingly, the rolling elements are unevenly worn with time and become harder to roll, which increases the degree of sliding of the rolling elements relative to the rotating ring and the frame. As a result, the rolling elements are quickly worn and the rotating ring comes into contact with the frame. Accordingly, the rotational resistance of the rotary table increases and the rotating ring and the frame are worn, which leads to a reduction in the workpiece-processing accuracy.

SUMMARY OF THE INVENTION

In order to solve the above-described problems, an object of the present invention is to provide an index table assembly in which a rotary table can easily rotate and the rotary table and a frame are prevented from being worn by coming into contact with each other, thereby maintaining the workpiece-processing accuracy.

In order to attain the above-described object, an index table assembly according to the present invention includes a rotary table; a frame separated from the rotary table in the direction of a rotational axis of the rotary table; a clamping device for bringing the rotary table into contact with the frame by moving the rotary table along the rotational axis; a first bearing disposed between the rotary table and the frame; and an urging device disposed between the first bearing and one of the rotary table and the frame and pressing the first bearing against the other one of the rotary table and the frame at least when the rotary table rotates.

The rotary table receives the load of onboard components such as a workpiece, a process table, and a jig and its own load. Therefore, in the index table assembly including the clamping device for bringing the rotary table into contact with the frame by moving the rotary table along the rotational axis, there is a risk that the rotary table will come into contact with the frame due to these loads when the rotary table is unclamped from the clamping device. In such a case, rotational resistance of the rotary table is caused. However, according to the present invention, the urging device is disposed between the first bearing and one of the rotary table and the frame and presses the first bearing against the other one of the rotary table and the frame at least when the rotary table rotates. Therefore, the rotary table and the frame are prevented from coming into contact with each other due to the loads and rotational resistance of the rotary table is not caused by contact between the rotary table and the frame. In addition, since the urging device presses the first bearing against the other one of the rotary table and the frame by pressing, that is, since the urging device presses the other one of the rotary table and the frame by pressing with the first bearing, rotational resistance is not caused when the urging device and the other one of the rotary table and the frame rotate relative to each other. Therefore, rotational resistance of the rotary table is not caused by the urging device.

Accordingly, the rotary table can easily rotate with low rotational resistance, so that the energy is saved and an indexing speed is increased. In addition, the rotary table, the frame, and a driving device for the rotary table are prevented from being worn and the workpiece-processing accuracy is maintained.

In the index table assembly according to the present invention, the urging device may include a plurality of springs arranged along a circle centered on the rotational axis of the rotary table and the clamping device may bring the rotary table into contact with the frame against an urging force.

In such a case, since no dynamic power is used in the urging device, the structure of the urging device is simplified and the clamping device can clamp the rotary table.

In addition, in the index table assembly according to the present invention, the urging device may include a hydraulic actuator which is not activated when the rotary table is clamped.

In such a case, since the hydraulic actuator is not activated and the urging force applied by the urging device is removed when the rotary table is clamped, the clamping device can clamp the rotary table by bringing the rotary table into contact with the frame without being impeded by the urging device.

In addition, in the index table assembly according to the present invention, the index table assembly may further include a second bearing disposed between a surface of the rotary table on a side opposite to the side on which the first bearing and the urging device are provided and the frame facing the surface, and the urging device may press the rotary table against the second bearing at least when the rotary table rotates.

Accordingly, when the rotary table rotates, it is pressed against the second bearing and the second bearing is pressed against the frame by the rotary table. Accordingly, the rotary table is restrained from being moved along the rotational axis by the urging device and is positioned relative to the frame in the direction of the rotational axis without causing rotational resistance. Since the urging device presses the first bearing with a sufficient urging force while the rotary table rotates, the rotary table is prevented from being tilted.

In addition, in the index table assembly according to the present invention, the urging device may press the first bearing against the other one of the rotary table and the frame with an annular component.

In such a case, since the urging device presses the first bearing with the annular component, the first bearing is uniformly pressed over the entire circumference thereof. Accordingly, the rotary table is prevented from being tilted and the rotary table and the frame are prevented from coming into contact with each other when the rotary table rotates.

In addition, in the index table assembly according to the present invention, the clamping device may include the annular component and press the rotary table against the frame with the annular component, and the urging device may be disposed between the first bearing and the frame and press the first bearing against the rotary table with the annular component.

In such a case, the urging device presses the first bearing against the rotary table with the annular component, which is included in the clamping device. Accordingly, the overall structure of the index table assembly is simplified.

DESCRIPTION OF THE PREFERRED EMBODIMENTS

First Embodiment

Figure 1:
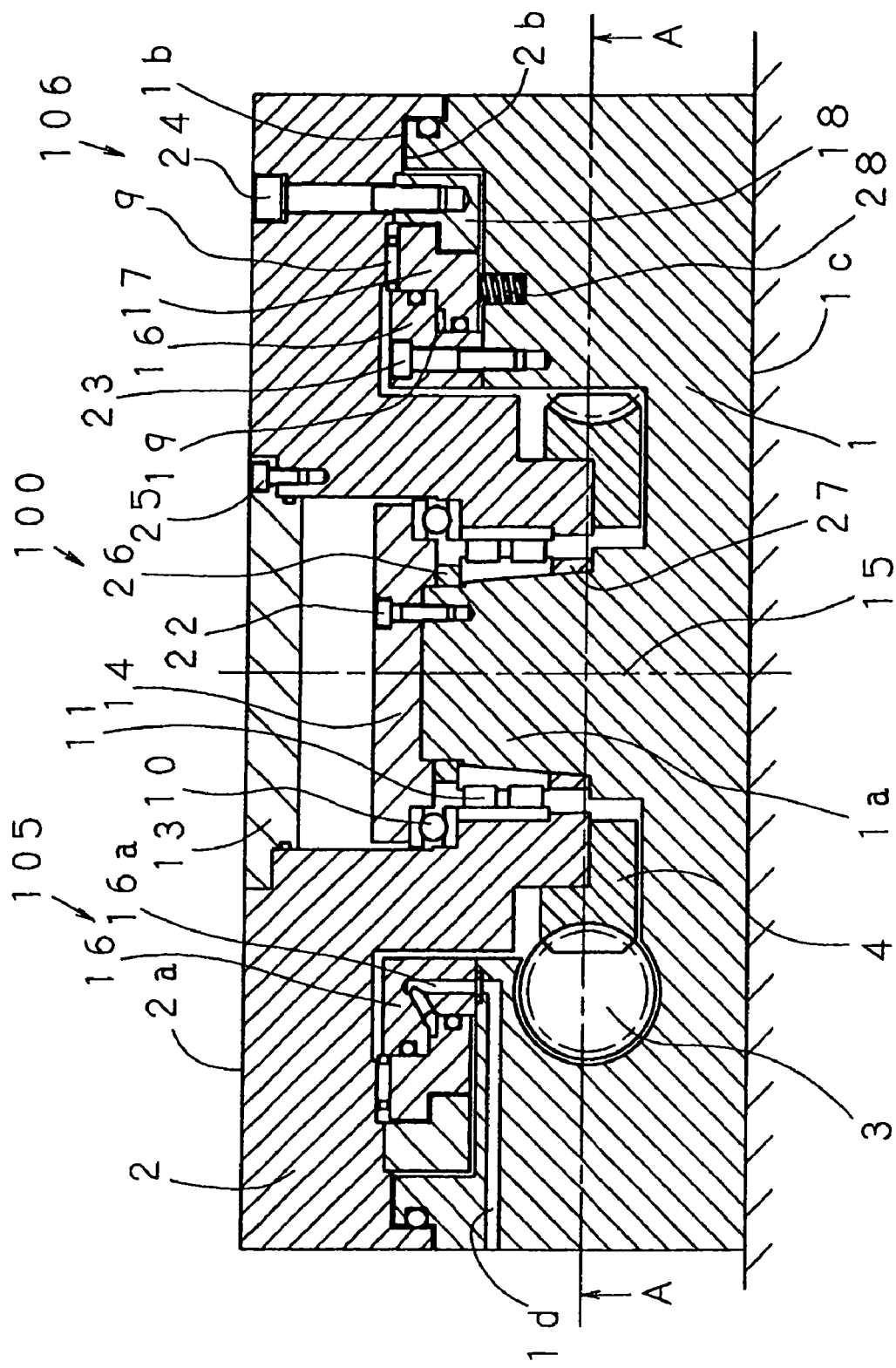
FIG. 1 is a sectional elevation view of an index table assembly according to a first embodiment of the present invention taken along line B-B in FIG. 2, which is a sectional plan view of the index table assembly, in a state in which a rotary table is unclamped.
Figure 2:
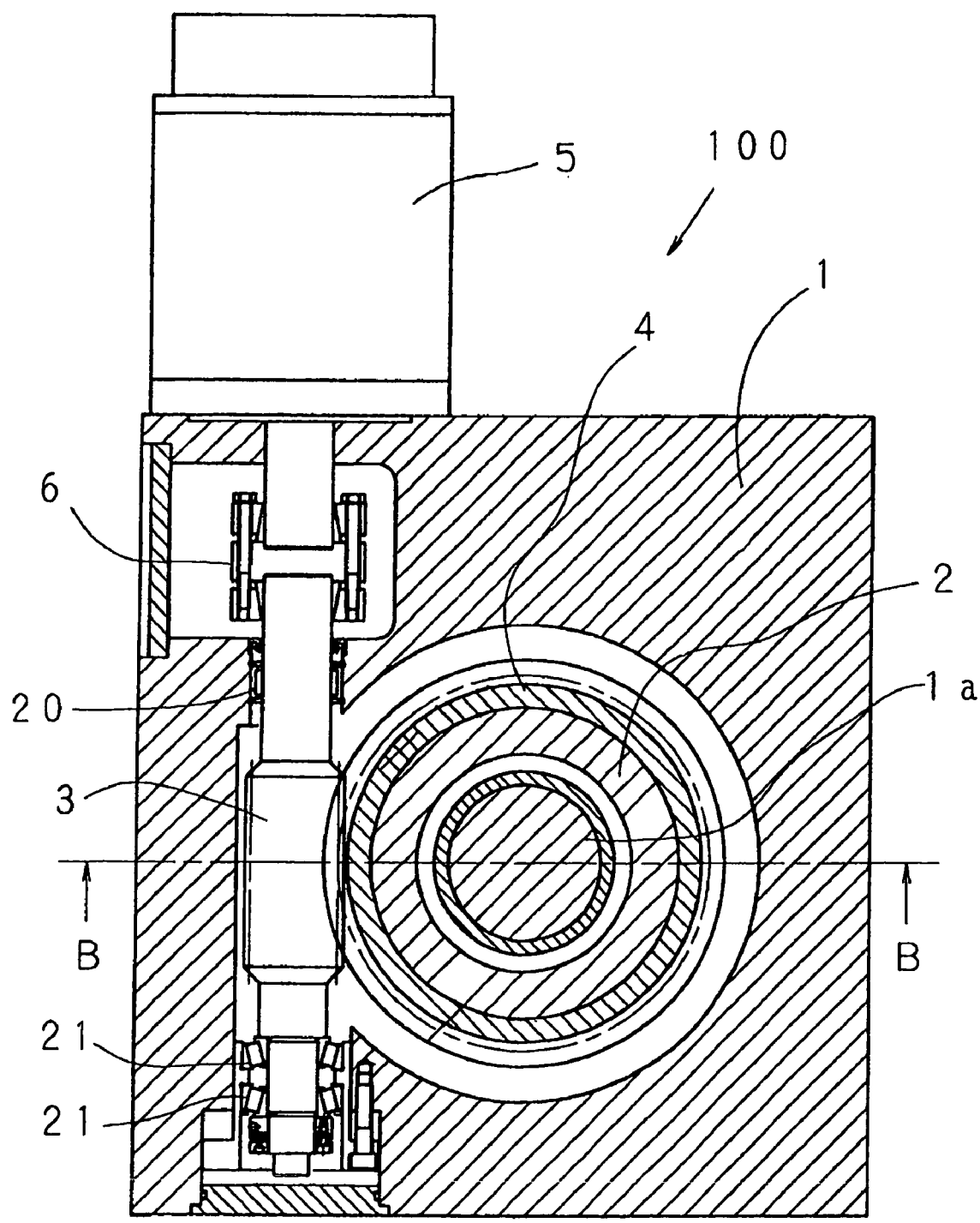
FIG. 2 is a sectional plan view of FIG. 1 taken along line A-A.
Figure 3:
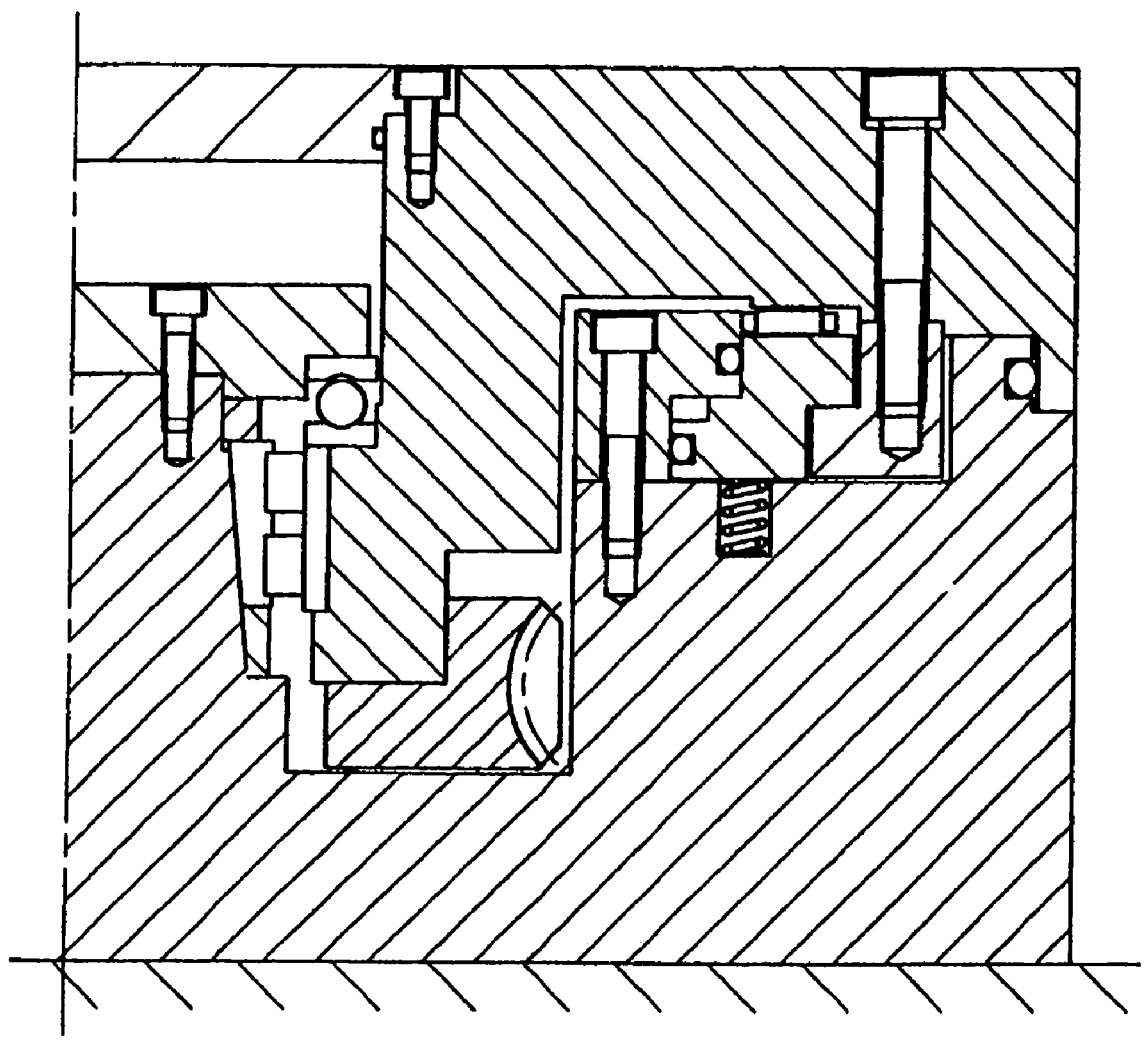
FIG. 3 is a sectional view of the main part of the index table assembly according to the first embodiment of the present invention in a state in which the rotary table is clamped.

Embodiments of the present invention will be described below with reference to the accompanying drawings. FIGS. 1 and 2 are a sectional elevation view and a sectional plan view, respectively, of an index table assembly 100 according to a first embodiment of the present invention in a state in which a rotary table 2 is unclamped. The sectional elevation view shown in FIG. 1 is taken along line B-B in FIG. 2, and the sectional plan view shown in FIG. 2 is taken along line A-A in FIG. 1. FIG. 3 is a sectional view showing the main part of the index table assembly 100 in a state in which the rotary table 2 is clamped.

The index table assembly 100 includes the rotary table 2, a frame 1 which supports the rotary table 2 such that the rotary table 2 can rotate, a worm wheel 4 fixed to the rotary table 2 with bolts (not shown), a worm 3 supported in the frame 1 by two tapered roller bearings 21 and a radial bearing 20 interposed between the worm 3 and the frame 1, and a drive motor 5 connected to the worm 3 with a coupling 6.

The rotary table 2 has a workpiece-receiving surface 2a which is perpendicular to a rotational axis 15 and to which a process table, a jig, and the like (not shown) are attached and a clamping surface 2b. The clamping surface 2b is on the side opposite to the workpiece-receiving surface 2a, and is also perpendicular to the rotational axis 15. In addition, a cover 13 is attached to the rotary table 2 with bolts 25 to prevent foreign bodies such as cutting chips and cutting fluid from entering the inside of the index table assembly 100.

The frame 1 has a base surface 1c which is fixed to a table surface of a machine tool (not shown) and a clamping surface 1b. The clamping surface 1b is on the side opposite to the base surface 1c, and is perpendicular to the rotational axis 15. In addition, the clamping surface 1b faces the clamping surface 2b of the rotary table 2.

In addition, the frame 1 includes a shaft portion 1a centered on the rotational axis 15 at the central region of the frame 1, and a radial roller bearing 11 is provided on the shaft portion 1a. An inner race of the radial roller bearing 11 is fitted around the shaft portion 1a and an outer race of the radial roller bearing 11 is fitted to the rotary table 2, so that the rotary table 2 is rotatably supported by the radial roller bearing 11. The inner race of the radial roller bearing 11 is fixed to the shaft portion 1a with distance rings 26 and 27 and a bearing holder 14, which is detachably fixed to the shaft portion 1a with bolts 22 at an end of the shaft portion 1a.

A clamping device 105 includes a fluid path 1d formed in the frame 1 and connected to a pressure fluid source (not shown), an annular cylinder 16 fixed to the frame 1 with bolts 23 and having a fluid path 16a communicating with the fluid path 1d, an annular piston 17 which is slidable along the rotational axis 15 while being guided by the outer peripheral surface of the cylinder 16, and a clamp ring 18 fixed to the rotary table 2 with bolts 24. A fluid pressure chamber 19 is provided between the outer peripheral surface of the cylinder 16 and the inner peripheral surface of the piston 17, and the fluid path 16a opens to the fluid pressure chamber 19 at one end thereof. Accordingly, the fluid pressure chamber 19 communicates with the fluid pressure source via the fluid paths 16a and 1d.

A surface of the rotary table 2 on the side opposite to the workpiece-receiving surface 2a is separated from the frame 1 in the direction of the rotational axis 15, and an urging device 106 and a thrust needle bearing 9, which serves as a first bearing, are disposed between them. The urging device 106 includes a plurality of compression coil springs 28 inserted in spring holes formed in the frame 1 along a circle centered on the rotational axis 15 at a constant interval. The compression coil springs 28 are in contact with the piston 17 while applying an urging force to the piston 17, and thereby press the thrust needle bearing 9 against the rotary table 2 with the piston 17, which serves as an annular component, interposed therebetween.

The rotary table 2 further has a surface on the side opposite to the side on which the thrust needle bearing 9 and the urging device 106 are provided, that is, on the same side as the workpiece-receiving surface 2a, and a thrust ball bearing 10, which serves as a second bearing, is placed between this surface and the bearing holder 14, that is, between this surface and the frame 1.

Processes of clamping and unclamping the rotary table 2 by the clamping device 105 will be described below.

As shown in FIG. 3, when the rotary table 2 is clamped, pressure fluid is supplied to the fluid pressure chamber 19 from the pressure fluid source via the fluid paths 1d and 16a, and the piston 17 moves toward the base surface 1c along the rotational axis 15 against the urging force applied by the compression coil springs 28. Accordingly, the clamp ring 18 engaging with the piston 17 moves together with the piston 17, and the rotary table 2 also moves toward the base surface 1c until the clamping surface 2b of the rotary table 2 and the clamping surface 1b of the frame 1 come into contact with each other. When the clamping surfaces 2b and 1b come into contact with each other, a frictional force is generated between them. Accordingly, the rotary table 2 is fixed to the frame 1 by the frictional force and is clamped such that it cannot rotate.

As shown in FIG. 1, when the rotary table 2 is unclamped, the pressure of the pressure fluid is reduced and the clamping surfaces 1b and 2b are released from each other. Accordingly, the rotary table 2 is unclamped such that it can rotate.

When the rotary table 2 is unclamped, it is supported by the thrust needle bearing 9 and the thrust ball bearing 10 as described below and can easily rotate with low rotational resistance.

The compression coil springs 28 are preferably designed by taking into account the load of onboard components such as a workpiece, a process table, and a jig and the load of the rotary table 2. In the present embodiment, the compression coil springs 28 generate an urging force sufficiently larger than the above-described loads placed thereon via the rotary table 2. Accordingly, when the pressure of the pressure fluid is reduced, the compression coil springs 28 press the piston 17, and the piston 17 presses the thrust needle bearing 9 against the rotary table 2. Thus, the piston 17, the thrust needle bearing 9, and the rotary table 2 move away from the base surface 1c, and the clamping surface 2b is separated from the clamping surface 1b.

When the rotary table 2 moves away from the base surface 1c, it presses the thrust ball bearing 10 provided as the second bearing. More specifically, the rotary table 2 presses the thrust ball bearing 10 against the bearing holder 14, that is, against the frame 1, so that the rotary table 2 is positioned relative to the frame 1 in the direction of the rotational axis 15. In this state, the clamping surface 2b and the clamping surface 1b face each other with a predetermined gap provided therebetween.

While the clamping surface 2b and the clamping surface 1b face each other with a predetermined gap provided therebetween, the compression coil springs 28 continuously generate an urging force sufficiently larger than the load of the onboard components such as a workpiece, a process table, and a jig and the load of the rotary table 2. Therefore, the rotary table 2 is prevented from being tilted due to these loads, particularly when the loads are placed unevenly. Accordingly, rotational resistance is not caused by contact between the clamping surface 2b and the clamping surface 1b.

In addition, although the rotary table 2 presses the bearing holder 14, that is, the frame 1 for positioning itself relative to the frame 1 in the direction of the rotational axis 15, the rotary table 2 presses the bearing holder 14 with the thrust ball bearing 10 interposed therebetween. Therefore, rotational resistance is not applied to the rotary table 2 by frictional force generated between the rotary table 2 and the frame 1.

As described above, in the index table assembly 100 according to the present embodiment, the rotary table 2 is prevented from coming into contact with the frame 1 at least when it rotates, that is, when it is unclamped in the present embodiment, so that rotational resistance of the rotary table 2 is not caused and the clamping surfaces 1b and 2b are prevented from being worn. In addition, since the bearings, that is, the thrust needle bearing 9 and the thrust ball bearing 10 are placed between the rotary table 2 and the frame 1, rotational resistance is not caused by engaging between the rotary table 2 and the frame 1 when the rotary table 2 is unclamped.

Second Embodiment

Figure 4:
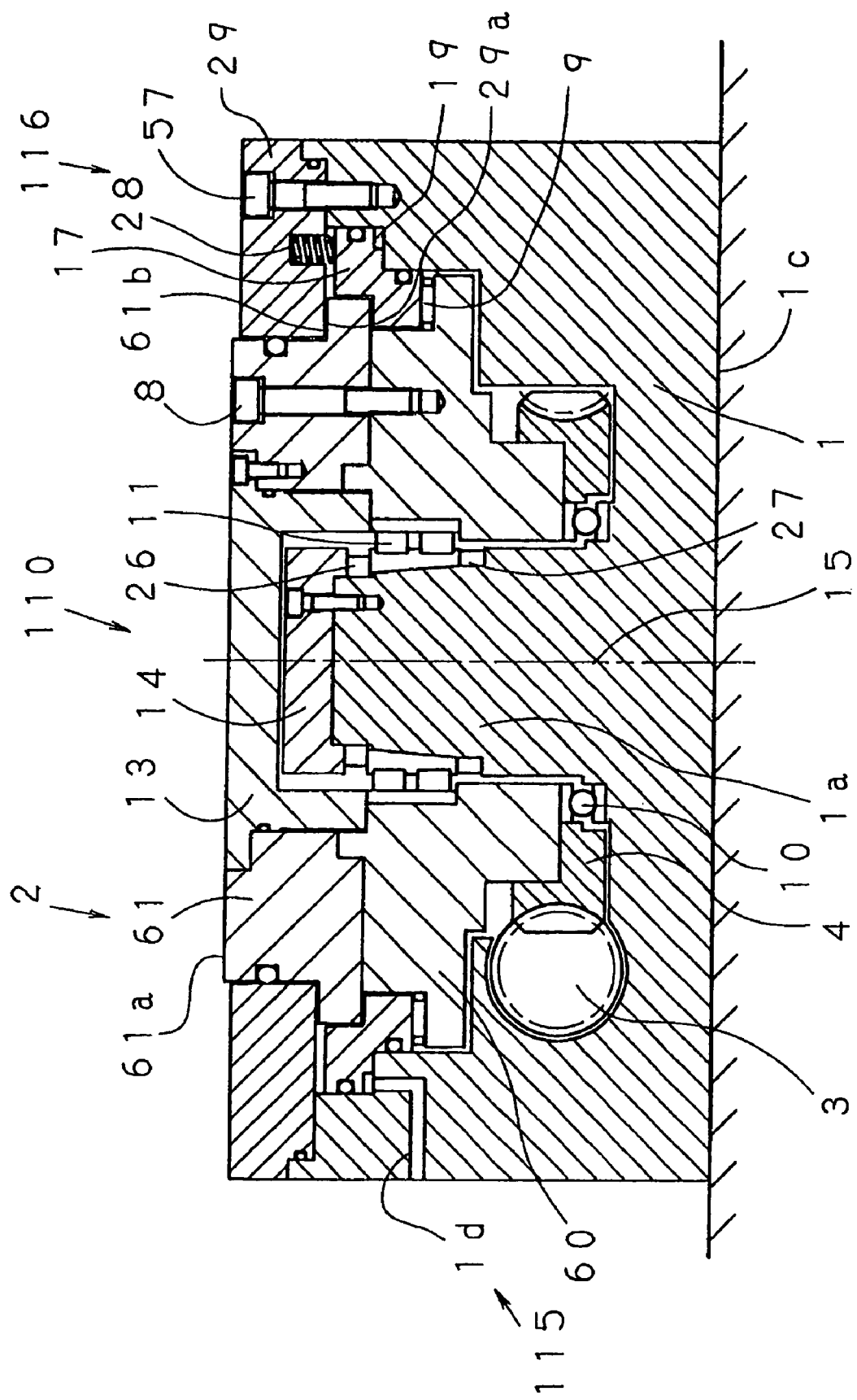
FIG. 4 is a sectional view of an index table assembly according to a second embodiment of the present invention.

FIG. 4 shows an index table assembly 110 according to a second embodiment of the present invention in a state in which a rotary table 2 is unclamped.

The rotary table 2 includes a bearing support 60 and a workpiece receiver 61, and the bearing support 60 and the workpiece receiver 61 are fixed to each other with bolts 8. The workpiece receiver 61 has a workpiece-receiving surface 61a and a clamping surface 61b.

A clamping device 115 includes an annular piston 17 and a frame 1 having a fluid path 1d connected to a pressure fluid source and a sliding surface along which the piston 17 slides on the inner periphery of the frame 1. A fluid pressure chamber 19 is formed between the inner peripheral surface of the frame 1 and the outer peripheral surface of the piston 17, and the fluid path 1d opens to the fluid pressure chamber 19 at one end thereof. Accordingly, the fluid pressure chamber 19 communicates with the fluid pressure source via the fluid path 1d.

A surface of the rotary table 2 on the same side as the workpiece-receiving surface 61a is separated from the frame 1 in the direction of the rotational axis 15, and an urging device 116 and a thrust needle bearing 9, which serves as a first bearing, are disposed between them. The urging device 116 includes a plurality of compression coil springs 28 inserted in spring holes formed in a spring base 29, which is fixed to the frame 1 with bolts 57, along a circle centered on the rotational axis 15 at a constant interval. The compression coil springs 28 are in contact with the piston 17 while applying an urging force to the piston 17, and thereby press the thrust needle bearing 9 against the rotary table 2 with the piston 17, which serves as an annular component, interposed therebetween.

The rotary table 2 further has a surface on the side opposite to the side on which the thrust needle bearing 9 and the urging device 116 are provided, that is, on the side opposite to the workpiece-receiving surface 61a, and a thrust ball bearing 10, which serves as a second bearing, is placed between this surface and the frame 1.

Processes of clamping and unclamping the rotary table 2 by the clamping device 115 are performed similar to the first embodiment. More specifically, the piston 17 moves toward the workpiece-receiving surface 61a along the rotational axis 15 against the urging force applied by the compression coil springs 28. Accordingly, the rotary table 2, which engages with the piston 17, moves away from a base surface 1c until the clamping surface 61b of the rotary table 2 and a clamping surface 29a of the spring base 29 come into contact with each other. Thus, the rotary table 2 is fixed to the frame 1 by a frictional force and is clamped such that it cannot rotate.

When the rotary table 2 is unclamped, it is released such that it can rotate, and is supported by the thrust needle bearing 9 and the thrust ball bearing 10 such that it can easily rotate with low rotational resistance. In addition, similar to the first embodiment, the rotary table 2 is positioned in the direction of the rotational axis 15 by the thrust ball bearing 10 such that the clamping surfaces 61b and 29a face each other with a predetermined gap provided therebetween.

When the pressure of the pressure fluid is reduced, the compression coil springs 28 press the piston 17, and the piston 17 presses the thrust needle bearing 9 against the rotary table 2. Thus, the piston 17, the thrust needle bearing 9, and the rotary table 2 move toward the base surface 1c, and the clamping surface 61b is separated from the clamping surface 29a.

When the rotary table 2 moves toward the base surface 1c, it presses the thrust ball bearing 10, which is provided as the second bearing. More specifically, the rotary table 2 presses the thrust ball bearing 10 against the frame 1, so that the rotary table 2 is positioned relative to the frame 1 in the direction of the rotational axis 15. In this state, the clamping surface 61b and the clamping surface 29a face each other with a predetermined gap provided therebetween.

Similar to the index table assembly 100 according to the first embodiment, in the index table assembly 110 according to the second embodiment, the rotary table 2 is prevented from coming into contact with the frame 1 at least when it rotates, that is, when it is unclamped in the present embodiment, so that rotational resistance of the rotary table 2 is not caused and the clamping surfaces 29a and 61b are prevented from being worn. In addition, since the bearings, that is, the thrust needle bearing 9 and the thrust ball bearing 10 are placed between the rotary table 2 and the frame 1, rotational resistance is not caused by engaging between the rotary table 2 and the frame 1.

Third Embodiment

Figure 5:
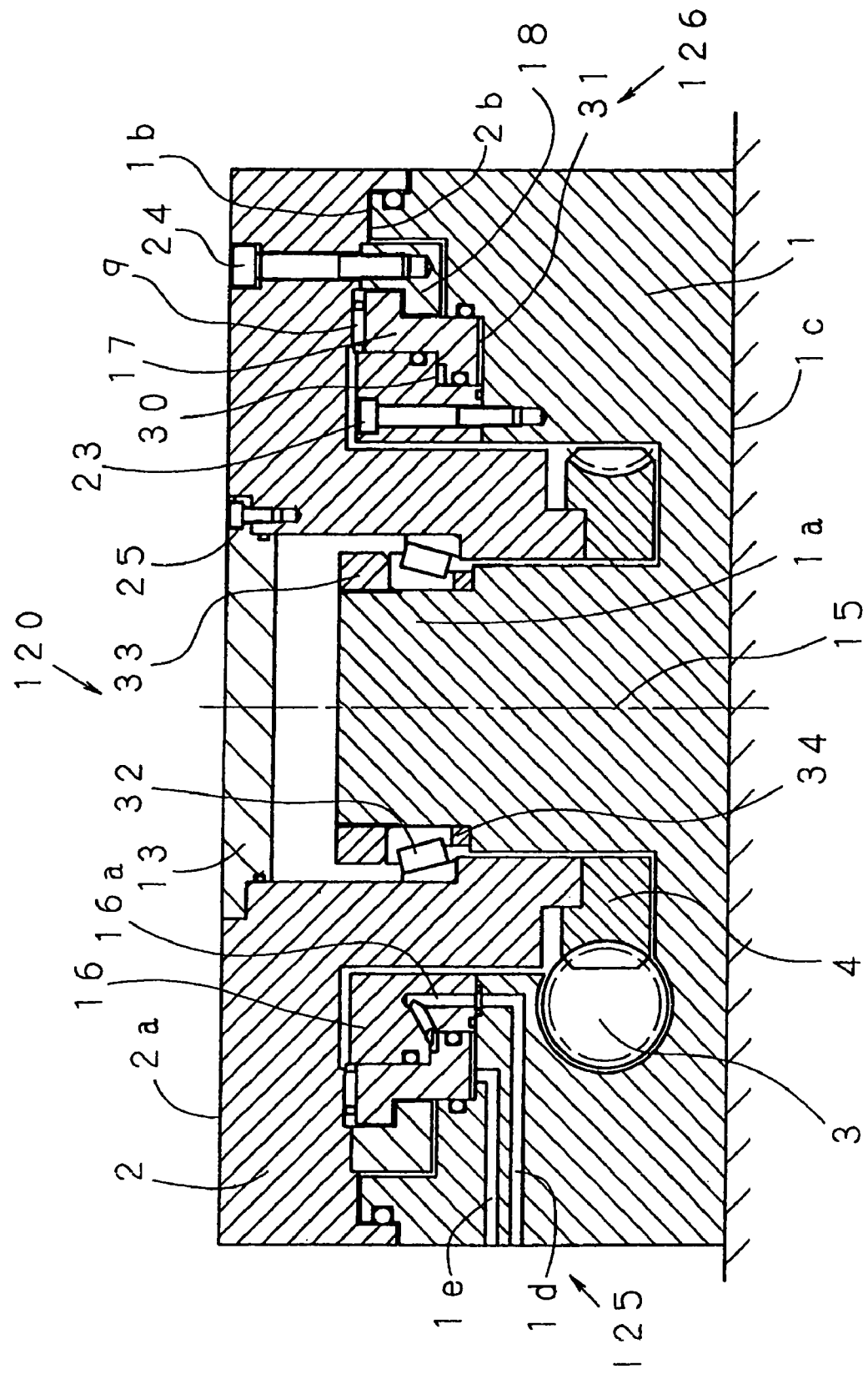
FIG. 5 is a sectional view of an index table assembly according to a third embodiment of the present invention.

FIG. 5 shows an index table assembly 120 according to a third embodiment of the present invention in a state in which a rotary table 2 is unclamped.

In the index table assembly 100 according to the first embodiment, the urging device 106 includes a plurality of springs. In comparison, an urging device 126 of the index table assembly 120 includes a hydraulic actuator. In addition, different from the index table assembly 100 in which the thrust ball bearing 10 is provided as the second bearing, the index table assembly 120 includes a tapered roller bearing 32 as a second bearing. The tapered roller bearing 32 serves the functions of both a radial bearing and a thrust bearing.

A frame 1 includes a shaft portion 1a centered on a rotational axis 15 at the central region of the frame 1, and the tapered roller bearing 32 is provided on the shaft portion 1a. An inner race of the tapered roller bearing 32 is fitted around the shaft portion 1a and an outer race of the tapered roller bearing 32 is fitted to the rotary table 2, so that the rotary table 2 is rotatably supported by the tapered roller bearing 32. The inner race of the tapered roller bearing 32 is fixed to the shaft portion 1a with a distance ring 34 and a nut 33 which is screwed on a male thread formed in the shaft portion 1a at an end thereof.

A clamping device 125 is identical to the clamping device 105 included in the index table assembly 100 according to the first embodiment is provided. Similar to the clamping device 105, the rotary table 2 is clamped by bringing a clamping surface 2b of the rotary table 2 and a clamping surface 1b of the frame 1 into contact with each other.

A surface of the rotary table 2 on the side opposite to a workpiece-receiving surface 2a is separated from the frame 1 in the direction of a rotational axis 15, and the urging device 126 and a thrust needle bearing 9, which serves as a first bearing, are disposed between them. The urging device 126 includes a piston 17 and a cylinder 16 included in the clamping device 125, the frame 1, and a fluid path 1e formed in the frame 1 and connected to a pressure fluid source (not shown). A fluid pressure chamber 31 for urging is provided between the outer peripheral surface of the cylinder 16 and the inner peripheral surface of the frame 1, and the fluid path 1e opens to the fluid pressure chamber 31 at one end thereof. Accordingly, the fluid pressure chamber 31 communicates with the fluid pressure source via the fluid path 1e.

When the rotary table 2 is unclamped, a switching valve (not shown) changes the flow path to which pressure fluid from the pressure fluid source is supplied from a fluid path 1d to the fluid path 1e. Accordingly, the pressure of the pressure fluid in a fluid pressure chamber 30 is reduced and the rotary table 2 is unclamped. In addition, the pressure fluid flows into the fluid pressure chamber 31 and moves the piston 17 toward the workpiece-receiving surface 2a. The piston 17 presses the thrust needle bearing 9 against the rotary table 2, and the rotary table 2 presses the outer race of the tapered roller bearing 32. The outer race of the tapered roller bearing 32 presses rolling elements which are restrained from moving along the rotational axis 15 by the inner race. Accordingly, the rotary table 2 is positioned in the direction of the rotational axis 15, and the clamping surfaces 2b and 1b face each other with a predetermined gap provided therebetween.

According to the present embodiment, when the rotary table 2 is unclamped, the switching valve changes the flow path to which the pressure fluid from the pressure fluid source is supplied from the fluid path 1d to the fluid path 1e. However, supply of the pressure fluid may also be stopped when the rotary table 2 is unclamped. In such a case, the pressure fluid is supplied to the fluid path 1e when the rotary table 2 rotates.

Similar to the index table assembly 100, the rotary table 2 is prevented from coming into contact with the frame 1 at least when it rotates, so that rotational resistance of the rotary table 2 is not caused and the clamping surfaces 1b and 2b are prevented from being worn. In addition, since the bearings, that is, the thrust needle bearing 9 and the tapered roller bearing 32 are placed between the rotary table 2 and the frame 1, rotational resistance is not caused by engaging between the rotary table 2 and the frame 1.

Fourth Embodiment

Figure 6:
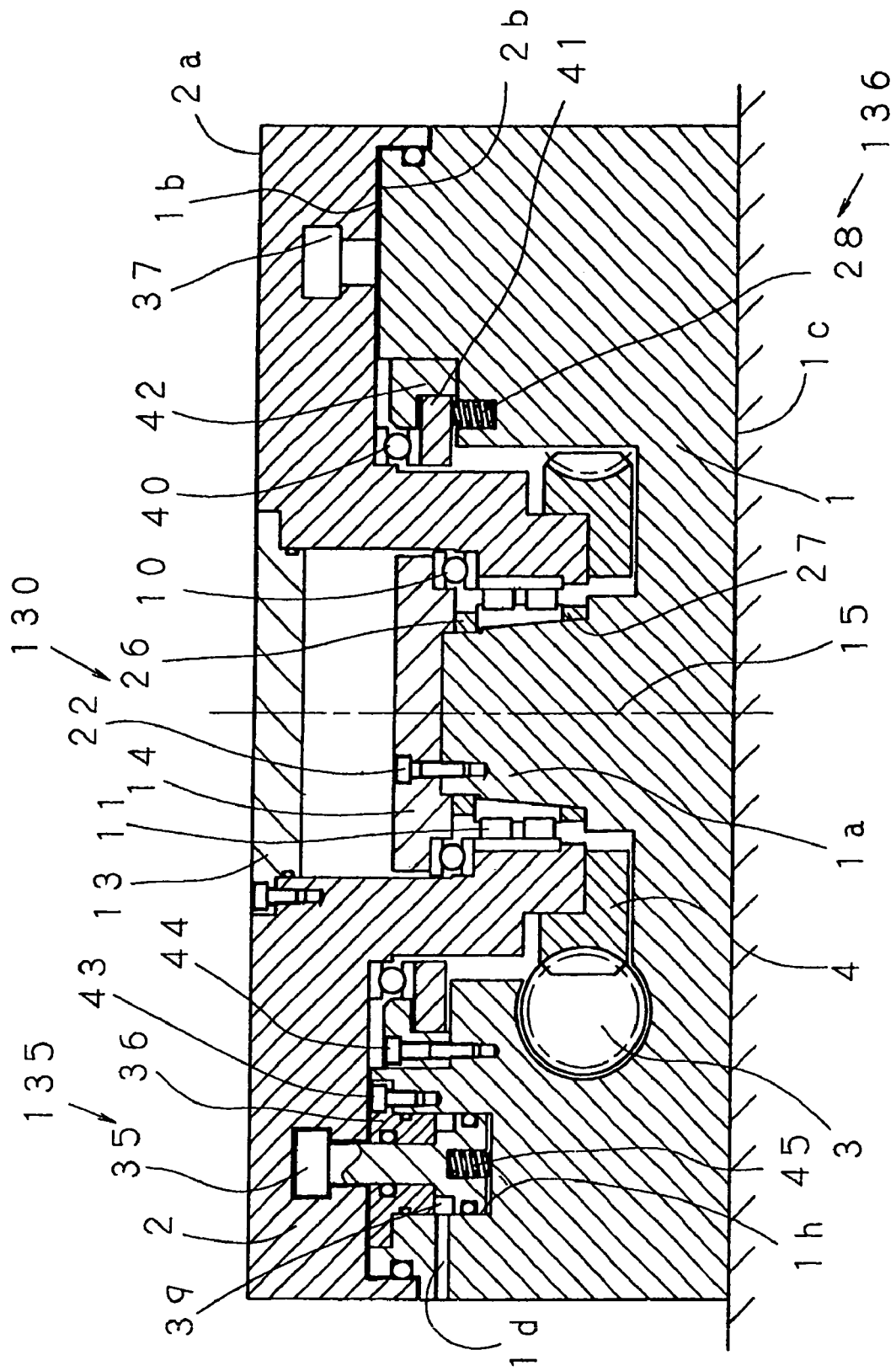
FIG. 6 is a sectional view of an index table assembly according to a fourth embodiment of the present invention.

FIG. 6 shows an index table assembly 130 according to a fourth embodiment of the present invention in a state in which a rotary table 2 is unclamped.

Similar to the index table assembly 100 according to the first embodiment, a frame 1 includes a shaft portion 1a centered on a rotational axis 15 at the central region of the frame 1, and a radial roller bearing 11 is provided on the shaft portion 1a. An inner race of the radial roller bearing 11 is fitted around the shaft portion 1a and an outer race of the radial roller bearing 11 is fitted to the rotary table 2, so that the rotary table 2 is rotatably supported by the radial roller bearing 11. The inner race of the radial roller bearing 11 is fixed to the shaft portion 1a with distance rings 26 and 27 and a bearing holder 14 which is detachably fixed to the shaft portion 1a with bolts 22 at an end of the shaft portion 1a.

A clamping device 135 includes a fluid path 1d formed in the frame 1 and connected to a pressure fluid source (not shown); a plurality of cylinder holes 1h formed in the frame 1 along a circle centered on the rotational axis 15 at a constant interval; pistons 35 inserted in the cylinder holes 1h and having flanges at an end thereof; piston holders 36 fixed to the frame 1 with bolts 43 and inserted into the cylinder holes 1h; a piston groove 37 with a T-shaped cross section formed in the rotary table 2 along a circle centered on the rotational axis 15 over the entire circumference thereof such that the piston groove 37 opens in a clamping surface 2b, the piston groove 37 accommodating the flanges of the pistons 35; and compression coil springs 45 inserted in spring holes formed in the pistons 35 at the end opposite to the flanges. Fluid pressure chambers 39 are formed between the cylinder holes 1h and the pistons 35, and the fluid path 1d opens to the fluid pressure chambers 39 at one end thereof. The compression coil springs 45 are in contact with the frame 1 at one end thereof and urge the pistons 35 toward a workpiece-receiving surface 2a.

A surface of the rotary table 2 on the side opposite to the workpiece-receiving surface 2a is separated from the frame 1 in the direction of the rotational axis 15, and an urging device 136, a pressing ring 41, and a thrust ball bearing 40, which serves as a first bearing, are disposed between them. The urging device 136 includes a plurality of compression coil springs 28 inserted in spring holes formed in the frame 1 along a circle centered on the rotational axis 15 at a constant interval. The compression coil springs 28 are in contact with the pressing ring 41 while applying an urging force to the pressing ring 41, and thereby press the thrust ball bearing 40 against the rotary table 2 with the pressing ring 41 interposed therebetween. In addition, a guide ring 42 is fixed to the frame 1 with bolts 44, and the pressing ring 41 is guided by the guide ring 42.

Processes of clamping and unclamping the rotary table 2 by the clamping device 135 will be described below.

When the rotary table 2 is clamped, pressure fluid is supplied to the fluid pressure chambers 39 from the pressure fluid source via the fluid path 1d, and the pistons 35 move toward a base surface 1c along the rotational axis 15 against the urging force applied by the compression coil springs 28 and 45. Accordingly, the rotary table 2, which is engaged with the pistons 35 by the piston groove 37, moves toward the base surface 1c until the clamping surface 2b of the rotary table 2 and a clamping surface 1b of the frame 1 come into contact with each other. When the clamping surfaces 2b and 1b come into contact with each other, a frictional force is generated between them. Accordingly, the rotary table 2 is fixed to the frame 1 by the frictional force and is clamped such that it cannot rotate.

When the rotary table 2 is unclamped, the pressure of the pressure fluid is reduced and the pistons 35 are pressed against the rotary table 2 by the urging force applied by the compression coil springs 45, so that the clamping surfaces 1b and 2b are released from each other. Accordingly, the rotary table 2 is unclamped such that it can rotate.

Similar to the index table assembly 100 according to the first embodiment, when the rotary table 2 unclamped, it is supported by two thrust bearings, that is, the thrust ball bearing 40 and a thrust ball bearing 10 and can easily rotate with low rotational resistance.

When the pressure of the pressure fluid is reduced, the compression coil springs 28 press the pressing ring 41, and the pressing ring 41 presses the thrust ball bearing 40 against the rotary table 2. Thus, the pressing ring 41, the thrust ball bearing 40, and the rotary table 2 move away from the base surface 1c, and the clamping surface 2b is separated from the clamping surface 1b.

Similar to the index table assembly 100 according to the first embodiment, the rotary table 2 presses the thrust ball bearing 10, which is provided as a second bearing, so that the rotary table 2 is positioned relative to the frame 1 in the direction of the rotational axis 15. In this state, the clamping surface 2b and the clamping surface 1b face each other with a predetermined gap provided therebetween.

Accordingly, similar to the index table assembly 100 according to the first embodiment, rotational resistance of the rotary table 2 is not caused and the rotary table 2 and the frame 1 are prevented from being worn by coming into contact with each other at least when the rotary table 2 rotates, that is, when it is unclamped in the present embodiment.

Figure 7:
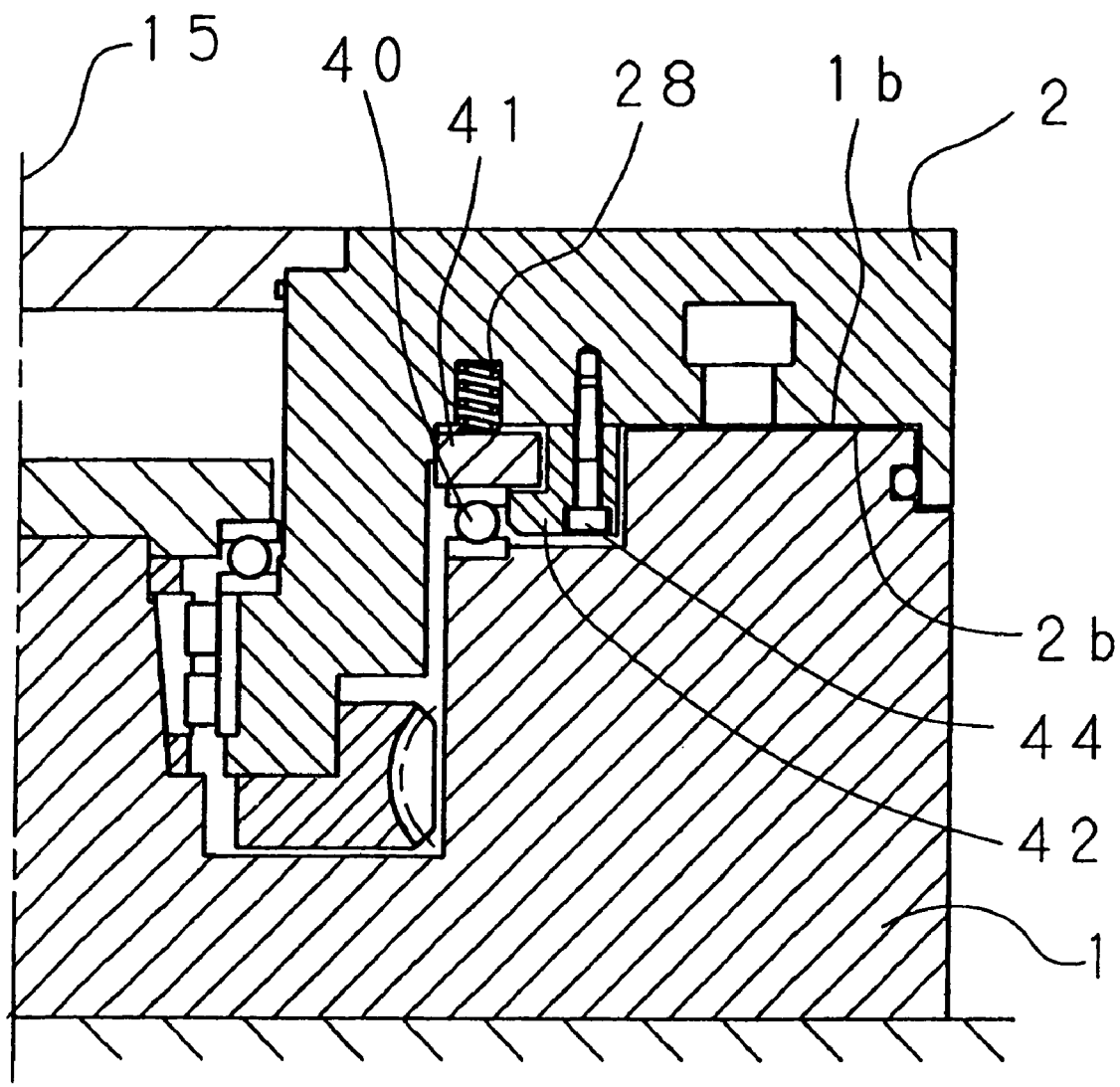
FIG. 7 is a sectional view of the main part of a modification of the index table assembly according to the fourth embodiment of the present invention.

As shown in FIG. 7, a plurality of spring holes for receiving the compression coil springs 28 may also be formed in the rotary table 2 along a circle centered on the rotational axis 15 at a constant interval. In such a case, the compression coil springs 28 press the thrust ball bearing 40 against the frame 1 with the pressing ring 41 interposed therebetween. Also in this case, the clamping surfaces 1b and 2b are separated from each other when the rotary table 2 is unclamped.

Fifth Embodiment

Figure 8:
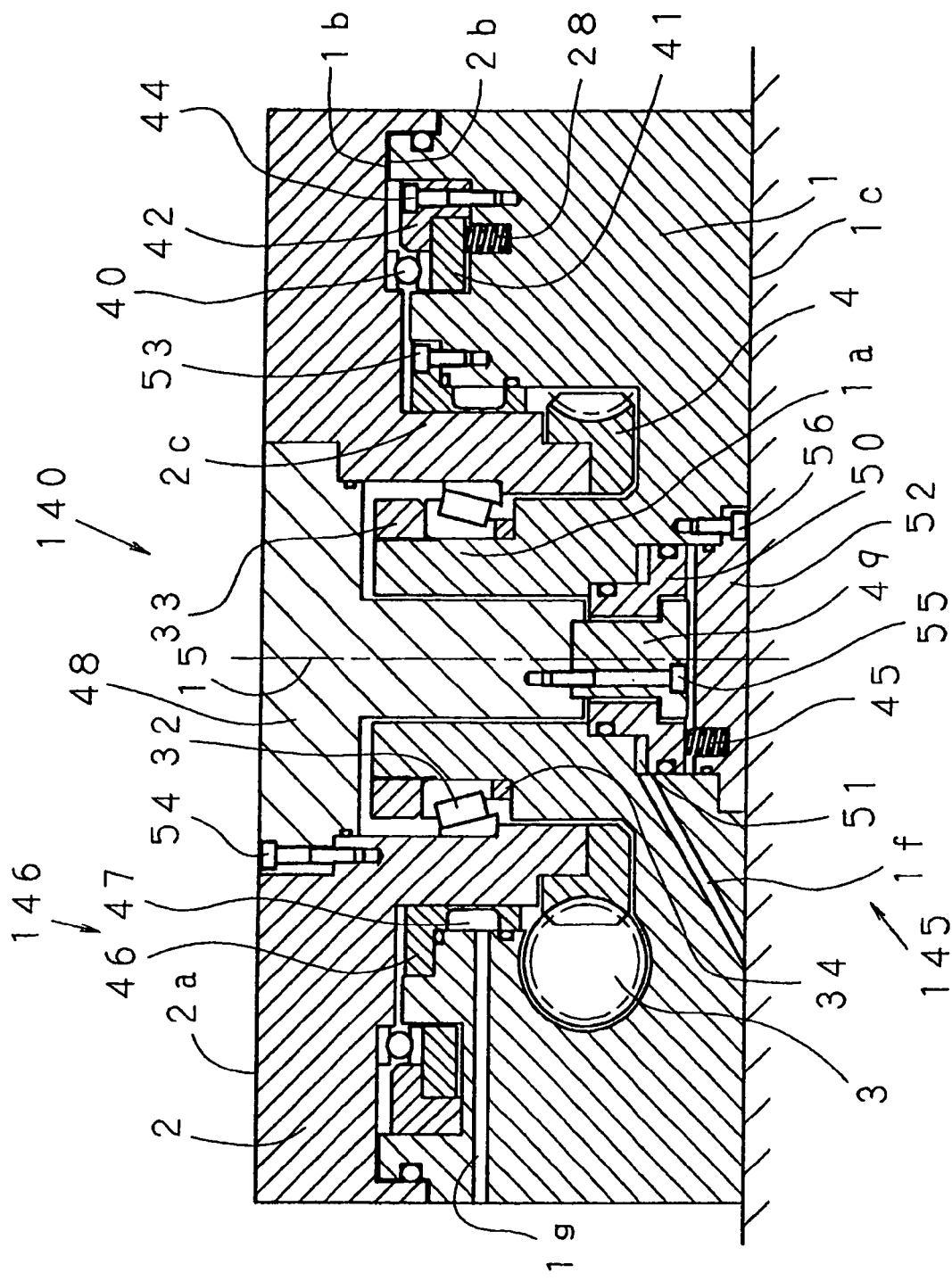
FIG. 8 is a sectional view of an index table assembly according to a fifth embodiment of the present invention.
Figure 9:
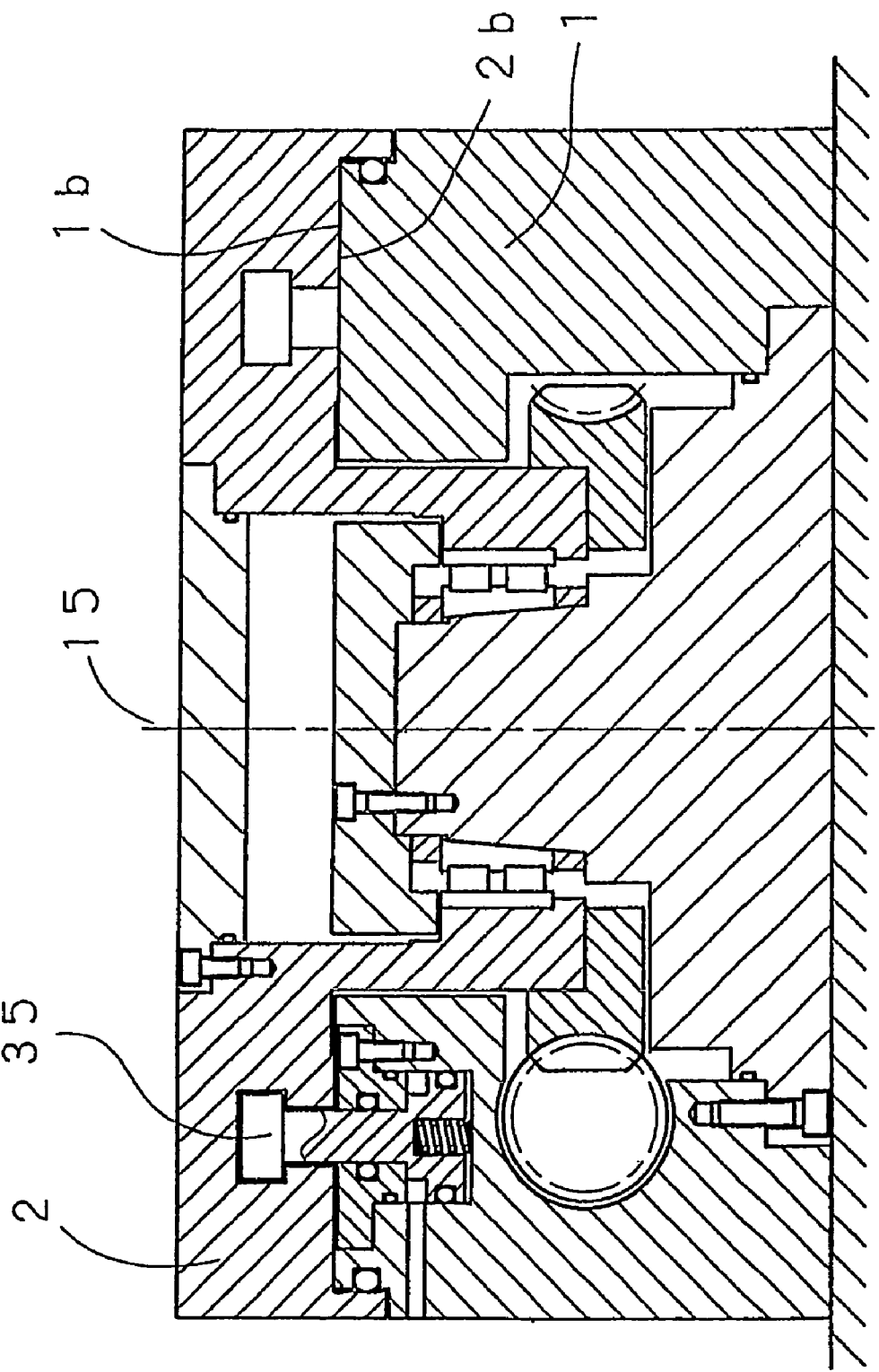
FIG. 9 is a sectional view of a known index table assembly.

FIG. 8 shows an index table assembly 140 according to a fifth embodiment of the present invention in a state in which a rotary table 2 is unclamped.

A surface of the rotary table 2 on the side opposite to a workpiece-receiving surface 2a is separated from a frame 1 in the direction of a rotational axis 15, and an urging device identical to the urging device 136 included in the index table assembly 130 according to the fourth embodiment, a pressing ring 41, and a thrust ball bearing 40 are disposed between them.

Two clamping devices 145 and 146 are provided, the clamping device 145 being used for bringing the rotary table 2 into contact with the frame 1 by moving the rotary table 2 along the rotational axis 15 and the clamping device 146 being used for bringing a component fixed to the frame 1 into contact with the rotary table 2 by deforming the component.

Similar to the index table assembly 120 according to the third embodiment, the frame 1 has a shaft portion 1a centered on the rotational axis 15 at the central region of the frame 1, and a tapered roller bearing 32 is provided on the shaft portion 1a. An inner race of the tapered roller bearing 32 is fitted around the shaft portion 1a and an outer race of the tapered roller bearing 32 is fitted to the rotary table 2, so that the rotary table 2 is rotatably supported by the tapered roller bearing 32. The inner race of the tapered roller bearing 32 is fixed to the shaft portion 1a with a distance ring 34 and a nut 33 which is screwed on a male thread formed in the shaft portion 1a at an end thereof.

The frame 1 has a through hole centered on the rotational axis 15, and a center shaft 48 fixed to the rotary table 2 with bolts 54 is inserted into the through hole. In addition, the through hole is provided with a cylinder in which a piston 50 is inserted. A fluid pressure chamber 51 is formed in the cylinder, and a fluid path if formed in the frame 1 and connected to a pressure fluid source opens to the fluid pressure chamber 51. A piston holder 49 is fixed on an end surface of the center shaft 48 with bolts 55 such that the piston holder 49 extends through a through hole formed in the piston 50 and is engaged with the piston 50. In addition, a spring holder 52 having a plurality of spring holes arranged along a circle centered on the rotational axis 15 is fixed to the frame 1 with bolts 56. The spring holes formed in the spring holder 52 accommodate compression coil springs 45 which are in contact with the piston 50 at one end thereof, and the compression coil springs 45 urge the piston 50 toward the workpiece-receiving surface 2a.

The clamping device 145 includes the cylinder formed in the through hole of the frame 1, the piston 50, the compression coil springs 45, the spring holder 52, the piston holder 49, and the fluid path 1f. When pressure fluid is supplied to the fluid pressure chamber 51, the rotary table 2 moves along the rotational axis 15 and comes into contact with the frame 1.

A clamp ring 46 is fixed to the frame 1 with bolts 53. The clamp ring 46 extends along the rotational axis 15, and the inner peripheral surface of the clamp ring 46 is fitted around a shaft portion 2c of the rotary table 2. In addition, the clamp ring 46 has a groove with a certain width along the rotational axis 15 in the outer peripheral surface thereof, the groove extending over the entire circumference of the clamp ring 46. Accordingly, a fluid pressure chamber 47 is formed between the clamp ring 46 and the frame 1 such that a thin portion of the clamp ring 46 is provided between the fluid pressure chamber 47 and the shaft portion 2c. The frame 1 has a fluid path 1g connected to the pressure fluid source, and the fluid path 1g opens to the fluid pressure chamber 47 at one end thereof.

The clamping device 146 includes the clamp ring 46 and the fluid path 1g. When the pressure fluid is supplied to the fluid pressure chamber 47, the thin portion of the clamp ring 46 fixed to the frame 1 is deformed and comes into contact with the rotary table 2.

Processes of clamping and unclamping the rotary table 2 by the two clamping devices 145 and 146 will be described below.

When the rotary table 2 is clamped, the pressure fluid is supplied to the fluid path 1f, and the piston 50 moves toward a base surface 1c of the frame 1 against the urging force applied by the compression coil springs 28 and 45 and press the piston holder 49, which is engaged with the piston 50. Accordingly, the piston holder 49 and the rotary table 2 moves together until a clamping surface 1b of the frame 1 and a clamping surface 2b of the rotary table 2 come into contact with each other. Thus, the rotary table 2 is clamped. Next, the pressure fluid is supplied to the fluid path 1g so that it flows into the fluid pressure chamber 47. Accordingly, the thin portion of the clamp ring 46 is deformed such that it swells inward and comes into contact with the shaft portion 2c of the rotary table 2. Thus, the clamp ring 46, which is fixed to the frame 1, comes into contact with the rotary table 2 and the rotary table 2 is strongly clamped.

When the rotary table 2 is unclamped, the pressure of the pressure fluid is reduced, so that the clamping surfaces 1b and 2b are released from each other and the thin portion of the clamp ring 46 and the shaft portion 2c of the rotary table 2 are also released from each other. Accordingly, the rotary table 2 is unclamped such that it can rotate.

When the pressure of the pressure fluid is reduced, the compression coil springs 28 press the pressing ring 41, and the pressing ring 41 presses the thrust ball bearing 40 against the rotary table 2. Accordingly, the rotary table 2 presses the outer race of the tapered roller bearing 32. The outer race of the tapered roller bearing 32 presses rolling elements which are restrained from moving along the rotational axis 15 by the inner race. Accordingly, the rotary table 2 is positioned in the direction of the rotational axis 15, and the clamping surfaces 2b and 1b face each other with a predetermined gap provided therebetween.

As in the modification of the index table assembly 130 according to the fourth embodiment shown in FIG. 7, a plurality of spring holes for receiving the compression coil springs 28 may also be formed in the rotary table 2 along a circle centered on the rotational axis 15 at a constant interval. In such a case, the compression coil springs 28 presses the thrust ball bearing 40 against the frame 1 with the pressing ring 41 interposed therebetween. Also in this case, the clamping surfaces 1b and 2b are separated from each other when the rotary table 2 is unclamped.

The present invention is not limited to the above-described embodiments, and various modifications are possible within the scope of the present invention.

What is claimed is:

1. An index table assembly comprising:
    a rotary table having a workpiece-receiving surface (2a) receiving the load of onboard components such as a workpiece;
    a frame separated from the rotary table in the direction of a rotational axis of the rotary table;
    a clamping device for causing rotational resistance of the rotary table by bringing the clamping surface of rotary table on the side opposite to the workpiece-receiving surface into contact with the frame by moving the rotary table together with the workpiece-receiving surface along the rotational axis, wherein the rotational resistance is caused by clamping the rotary table against the frame such that the rotary table cannot rotate;

a first bearing disposed between the rotary table and the frame;

an urging device disposed between the first bearing and the frame such that said urging device is in contact with the first bearing and the frame, and pressing the first bearing against the rotary table at least when the rotary table rotates; and a second bearing disposed between a surface of the rotary table and a surface of the frame facing the surface of the rotary table, said second bearing in contact with both said surfaces thereof, wherein the urging device presses the rotary table against the second bearing at least when the rotary table rotates.

2. An index table assembly according to claim 1, wherein the urging device comprises a plurality of springs arranged along a circle centered on the rotational axis of the rotary table and the clamping device brings the rotary table into contact with the frame against an urging force.

3. An index table assembly according to claim 1, wherein the urging device presses the first bearing against the rotary, and wherein the urging device contacts the first bearing with an urging force which comprises an annular component which can move in the direction of the rotational axis of the rotating table in the frame.

4. An index table assembly according to claim 3, wherein the clamping device includes the annular component and presses the rotary table against the frame with the annular component, and the urging device is disposed between the first bearing and the frame and presses the first bearing against the rotary table with the annular component.

* * * * *